No. 871,984. PATENTED NOV. 26, 1907.
F. B. COOK.
CABLE TERMINAL AND JUNCTION BOX.
APPLICATION FILED JULY 9, 1906.
2 SHEETS—SHEET 1.
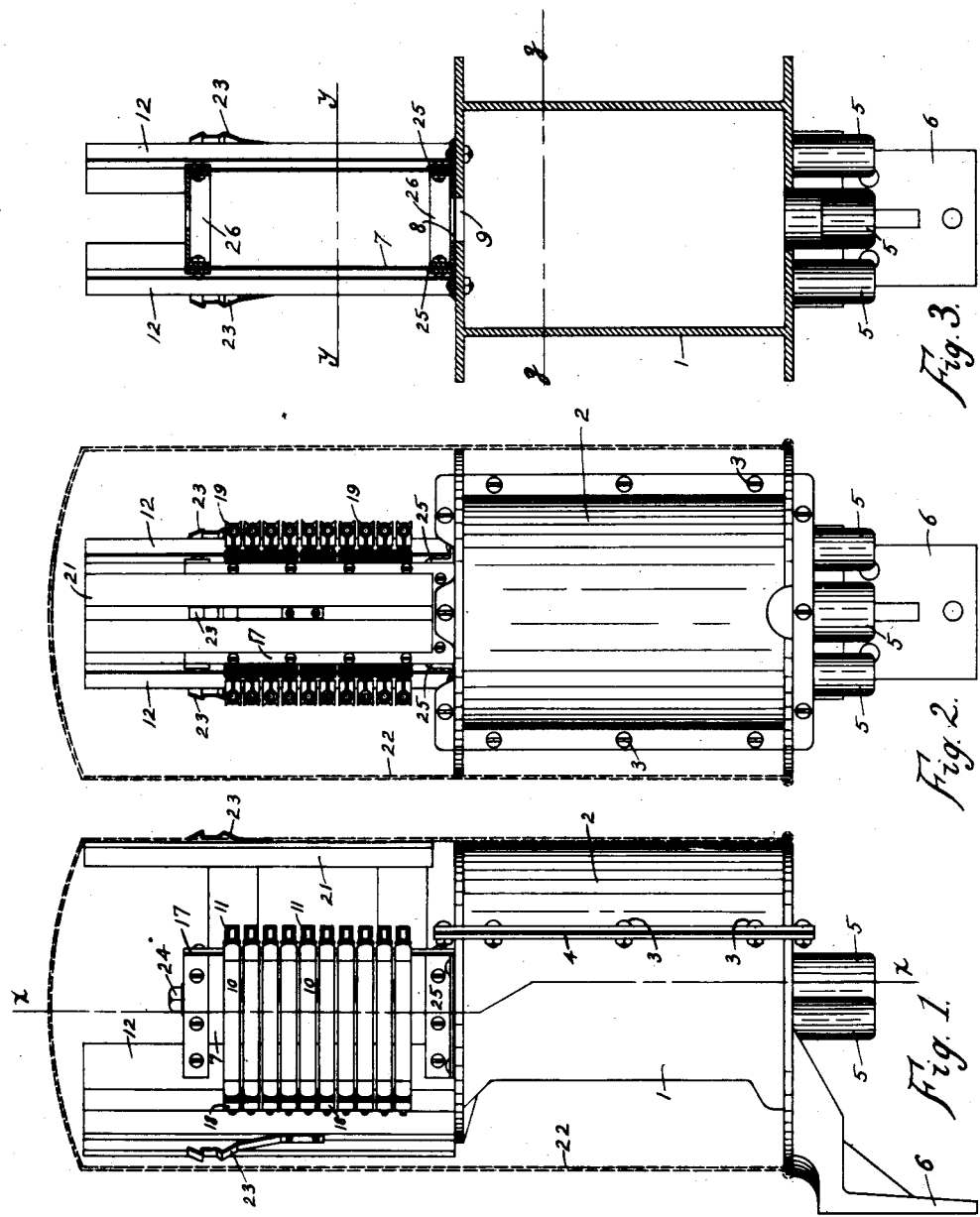
WITNESSES: INVENTOR:
Frederick R. Parker. Frank B. Cook.
Robert. G. Parker.

No. 871,984. PATENTED NOV. 26, 1907.
F. B. COOK.
CABLE TERMINAL AND JUNCTION BOX.
APPLICATION FILED JULY 9, 1906.
2 SHEETS—SHEET 2.
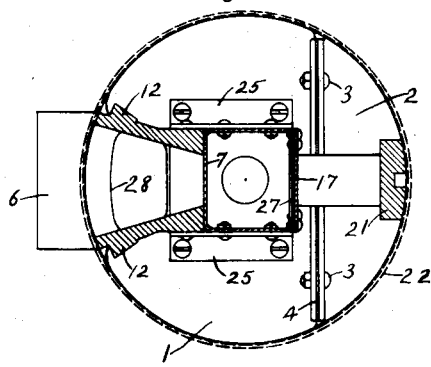
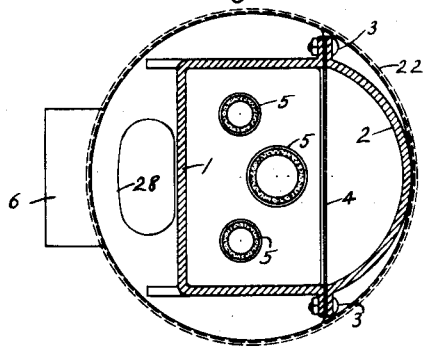
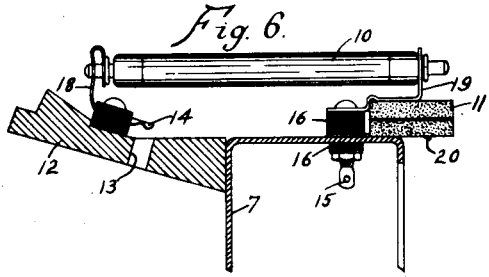
WITNESSES: Frederick R. Parker. Robt. G. Parker
INVENTOR: Frank B. Cook.

UNITED STATES PATENT OFFICE.

FRANK B. COOK, OF CHICAGO, ILLINOIS.

CABLE-TERMINAL AND JUNCTION-BOX.

No. 871,984.   Specification of Letters Patent.   Patented Nov. 26, 1907

Application filed July 9, 1906. Serial No. 325,325.

*To all whom it may concern:*

Be it known that I, FRANK B. COOK, a citizen of the United States of America, residing at Chicago, in the county of Cook and State of Illinois, have invented a new and useful Cable-Terminal and Junction-Box, of which the following is a specification, reference being had to the accompanying drawings, illustrating same.

My invention relates to cable terminals used in connection with telephone or telegraph cables, or the like, for distributing the conductors thereof and protecting same against injurious electricity of various forms.

The principal objects of my invention are to provide a cable terminal having an airtight and moisture-tight distributing box constructed of sheet metal; to provide an improved junction box which is very durable and accessible; to adapt the junction box to be used alone or in connection with the cable terminal; to adapt the junction box and cable terminal so that the terminal may be mounted on the junction box either before the latter is installed or at any time thereafter; to provide improved means whereby the sheet metal box of the cable terminal may be filled with an insulating compound; and to provide improved construction in such apparatus in general.

Other objects will be apparent from the following specification.

Heretofore it has not been the practice to use a junction box on which a cable terminal could be mounted after the junction box was installed. Where junction boxes were used they were used alone and did not have provisions for mounting a cable terminal thereon; or they were constructed in one piece with the cable terminal so they could not be separated. Furthermore, cable terminals of the inclosed type were generally constructed of cast iron and were therefore necessarily very heavy and inconvenient to handle.

In the present invention, I construct the terminal and junction box separately and adapt them so that the terminal can be mounted on the junction box at any time, either before or after the junction box is installed. This feature in such apparatus has many advantages. Sometimes it is desired to install a junction box at a certain point without distributing any of the cable conductors at this point, and then in the future to be able to distribute certain of the cable conductors at the junction box, in which case it is necessary to have a cable terminal in connection with the junction box. Then, with this invention, in case the distribution at any one point is insufficient, the cable terminal in use at this point may be removed and replaced by a larger terminal which is mounted to the junction box. By making the inclosed box of the cable terminal of sheet metal I greatly reduce the weight of such a terminal and thereby provide a terminal which is very easily handled and very strong and durable. The sheet metal affords facilities for improved construction in such a terminal. I may make the junction box either of cast iron or sheet metal, whichever is desired.

In the accompanying drawings, Figure 1 is a side elevation of the cable terminal and junction box, the terminal being mounted on the junction box; Fig. 2 is a front elevation of the cable terminal and junction box; Fig. 3 is a cross-sectional view of the cable terminal and junction box, taken on line $x$—$x$ of Fig. 1; Fig. 4 is a cross-sectional view of the cable terminal, taken on line $y$—$y$ of Fig. 3; Fig. 5 is a cross-sectional view of the junction box, taken on line $z$—$z$ of Fig. 3; and Fig. 6 is a detail view showing the mounting of the protective devices on the cable terminal.

Like characters refer to like parts in the several figures.

The junction box 1 is merely a box provided with a lid 2 which is secured thereto by bolts 3 3. A rubber gasket 4 is placed between the box portion 1 and lid 2 so as to keep the junction box air and moisture tight. The self-soldering nozzles 5 5 are secured to the bottom of the junction box, preferably by a screw connection therewith. It is not thought to be necessary to describe the self-soldering nozzles in detail, as their action and operation is well understood. These self-soldering nozzles form the subject matter of my copending application for Letters Patent on self-soldering sleeves for cables or the like, Serial No. 257,670, filed April 27, 1905. The junction box is provided with a mounting bracket 6 which may be mounted to the side of a pole or to a cross arm when the junction box is installed on a pole.

The sheet-metal box 7 of the cable terminal is preferably mounted on top of the junction box as shown in Fig. 3, when the terminal and junction box are used together, there being a rubber gasket 8 between the terminal and junction box to keep the joint air and moisture tight. A hole 9 is provided from the junction box to the cable terminal to accommodate the conductors leading to the terminal. The protective devices preferably comprising tubular fuses 10 10 and carbon lightning arresters 11 11 are mounted on opposite sides of the cable terminal as shown in detail in Fig. 6. Fanning strips 12 12 are preferably secured to the rear of the cable terminal and are each provided with a series of holes 13 13 therein to accommodate the line conductors leading from the terminals 14 14 of fuses 10 10. These line conductors preferably extend downward between the fanning strips 12 12 through a hole 28 in the lower base of the junction box, from whence they extend up the pole to the cross arms and aerial conductors of the system. The cable conductors extend through a self-soldering nozzle 5 into the inclosure of the junction box and then through hole 9 into the inclosure of the cable terminal where they are distributed to terminals 15 15, preferably being soldered to same. Terminals 15 15 are insulated from the sheet-metal box 7 by insulating bushings and washers 16 16, preferably as shown. The sheet-metal box 7 is preferably provided with a cover 17 on the front thereof which is removed when it is desired to distribute the cable conductors to terminals 15 15. A rubber gasket 27 is placed underneath the lid 17 to keep the joint air and moisture tight. Spring members 18 and 19 suitably hold the tubular fuses 10 10 in place in the circuit in a manner well understood. The lightning arresters 11 11 are held between springs 19 and 20, spring 20 being in electrical connection with the sheet-metal box 7. When the cable terminal is installed, the box 7 is preferably connected to earth, which gives a ground connection for the lightning arresters 11 11. The lid 17 of the box 7 preferably carries a guide strip 21 for the sheet-metal cover 22 which may be drawn down over the cable terminal and junction box to completely cover same. Guide strip 21 and the fanning strips 12 12 each preferably carry a spring member 23 which bears out against the sheet-metal cover 22 to hold same in place whether it is placed clear down over the terminal and junction box or partially raised. A screw plug 24 is preferably provided on the top of the cable terminal box to provide means for filling the box with an insulating compound, such as beeswax, paraffin, or the like, if desired, after the cable conductors are distributed to terminals 15 15 and the front plate 17 is put in place. It is not necessary to fill the terminal with an insulating compound as it is always kept air and moisture tight so as to properly protect the cable conductors inside thereof, but an insulating compound may be used by those who desire to use same. The terminal box 7 is preferably mounted on the junction box 1 by angle irons 25 25 and is preferably provided with end pieces 26 26 set in the sheet-metal portion 7 and bolted thereto. In making the cable terminal box, sheet-metal portion 7, end portions 26 26, angle irons 25 25, etc., are all assembled and bolted together tightly and then galvanized as a whole, the galvanizing sealing all of the joints perfectly tight. When it is desired to use the junction box 1 without the cable terminal, the hole 9 in the top thereof is simply covered by a plate which is secured to the junction box. If at any time in the future it is desired to attach a terminal to the junction box, the plate covering the hole 9 may be removed and the terminal mounted in place on the junction box.

All of the cable conductors leading to the junction box enter through the self-soldering nozzles 5 5. Some of the cable conductors may be carried to the terminal 7 and distributed therein, and others spliced within the junction box 1 and carried out of the junction box through the self-soldering nozzles and other cables. If desired, certain of the cable conductors can be left dead-ended in the junction box. A large cable can be carried to the junction box through a large self-soldering nozzle, part of the conductors thereof can be carried through hole 9 into terminal 7 and distributed there, part of the conductors can be left dead-ended in the junction box so that a large cable terminal may be mounted thereon at any time and then these conductors distributed in the terminal, and part of the conductors can be spliced to conductors of other cables and carried out from the junction box through other self-soldering nozzles. The cable conductors can be distributed and utilized in many different ways and it is not thought to be necessary to try to describe all of the different combinations and arrangements, in this specification.

The cable terminal herein shown can be used without the junction box, in which case it would be suitably mounted to a pole, or the like, and the cable to be distributed therein brought directly thereto through a self-soldering nozzle. If either the cable terminal or junction box be used separately, a shorter cover 22 will be used to cover same. The cover 22 may be locked down in place if desired.

I do not wish to limit this invention to the particular details of construction as herein shown, as many modifications in the construction may be made without departing from the scope of the invention.

What I claim as new and desire to secure by Letters Patent, is:—

1. A cable terminal comprising an inclosed box made of sheet metal, a removable cover for the front of the box, suitable fanning strips secured to the rear of the box, and suitable protective devices mounted on the said box and fanning strips.

2. A cable terminal comprising a sheet-metal box, a removable lid for one side of the box, suitable fanning strips secured to the said box, a series of spring members for supporting protective devices, mounted on the fanning strips, a series of spring members for supporting protective devices, mounted on opposite sides of the said box, and suitable protective devices carried by the said spring members.

3. A cable terminal comprising an inclosed sheet-metal box, a lid for the front side thereof, a rubber gasket placed underneath the lid to make an air-tight joint between same and the box, a guide strip carried by the said lid, fanning strips secured to the rear of the said box, suitable spring members carried by the said guide and fanning strips, and a suitable sheet-metal cover placed over the whole and bearing against the said spring members which hold same in place, the said guide strip and fanning strips serving as guides and supports for the said sheet-metal cover.

4. A cable terminal comprising a sheet-metal box having three sides made of a single piece of formed sheet metal, a removable lid for the front side thereof, suitable fanning strips secured to the rear of the box, a series of terminal pieces on each side of the box, extending from the outside thereof to the inside thereof and insulated therefrom, spring members carried by the said terminal pieces, spring members carried by the said fanning strips, and suitable protective devices carried by the said spring members.

5. A junction box comprising a box portion, a lid for one side thereof, a suitable gasket between the lid and the box to form an air-tight and moisture-tight joint therebetween, a suitable bracket for mounting the junction box, and provisions on the top of the junction box for accommodating a cable terminal which may be mounted thereto.

6. A junction box comprising a box portion, a removable lid therefor, a bracket for suitably mounting the junction box, a cable terminal apart from the inclosure of the junction box and adapted to be mounted thereon at any time, and a hole extending from the interior of the junction box into the cable terminal.

7. A junction box comprising a box portion, a removable lid therefor, a bracket for mounting the junction box, suitable means for accommodating cables leading to the junction box, a cable terminal comprising a sheet-metal box, suitable protective devices carried by the sheet-metal box, and suitable means and construction whereby the cable terminal may be mounted on the junction box at any time.

8. A junction box comprising a metal box portion, a suitable lid for the front thereof, means for securing the said lid to the box so as to provide an air-tight and moisture tight joint therebetween, a suitable bracket for mounting the junction box, suitable self-soldering nozzles secured to the bottom of the junction box and adapted to accommodate cables leading thereto, a cable terminal comprising an inclosed sheet-metal box, mounted upon the top of the junction box, a passage from the inclosure of the junction box to the inclosure of the cable terminal, for accommodating conductors leading from the junction box to the terminal, a removable cover for the front side of the cable terminal, suitable fanning strips secured to the rear of the cable terminal, a suitable guide carried by the cable terminal, a series of fuses and lightning arresters mounted on opposite sides of the cable terminal, a series of mounting springs for the said fuses, carried by the said fanning strips, a suitable sheet-metal cover for the said terminal and junction box, adapted to be pulled clear down over same, and spring members carried by the said guide and fanning strips for holding the said cover in place whether same is pulled clear down over the terminal and junction box or partially raised.

9. A cable terminal comprising an inclosed sheet-metal box having three sides made of a single piece of formed sheet metal and a removable side therefor, suitable fanning strips secured to the box, and protective devices mounted upon the sides of the said box and fanning strips.

As inventor of the foregoing, I hereunto subscribe my name in the presence of two subscribing witnesses, this second day of July, 1906.

FRANK B. COOK.

Witnesses:
   Jno. F. Tompkins,
   Frederick R. Parker.